(12) United States Patent  
Veilleux, Jr. et al.

(10) Patent No.: US 11,267,575 B2  
(45) Date of Patent: Mar. 8, 2022

(54) EQUALIZING WEARING OF TWO OR MORE ELECTRICAL POWER GENERATORS OF AN AIRCRAFT

(71) Applicant: Hamilton Sundstrand Corporation, Charlotte, NC (US)

(72) Inventors: Leo J. Veilleux, Jr., Wethersfield, CT (US); Lubomir A. Ribarov, West Hartford, CT (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 108 days.

(21) Appl. No.: 16/657,735

(22) Filed: Oct. 18, 2019

(65) Prior Publication Data

US 2021/0114739 A1    Apr. 22, 2021

(51) Int. Cl.
*H02J 4/00*          (2006.01)
*B64D 27/24*      (2006.01)
*B64F 5/60*        (2017.01)

(52) U.S. Cl.
CPC .............. *B64D 27/24* (2013.01); *B64F 5/60* (2017.01); *H02J 4/00* (2013.01); *B60L 2200/10* (2013.01)

(58) Field of Classification Search
CPC .... B64D 27/24; B64F 5/60; H02J 4/00; B60L 2200/10; B60L 50/61
USPC .......................................................... 307/9.1
See application file for complete search history.

(56) References Cited

U.S. PATENT DOCUMENTS

| | | | |
|---|---|---|---|
| 4,587,436 A | 5/1986 | Cronin | |
| 8,136,756 B2 | 3/2012 | Duces et al. | |
| 9,573,539 B2 | 2/2017 | Rozman et al. | |
| 9,871,260 B2 | 1/2018 | Ribarov et al. | |
| 2006/0061213 A1 | 3/2006 | Michalko | |
| 2009/0167076 A1 | 7/2009 | Serventi et al. | |
| 2013/0197725 A1 | 8/2013 | O'Dell et al. | |
| 2013/0197739 A1 | 8/2013 | Gallagher et al. | |
| 2017/0320586 A1* | 11/2017 | Boyd | B64D 31/06 |
| 2017/0334378 A1 | 11/2017 | Schult et al. | |
| 2021/0025333 A1* | 1/2021 | Morenko | F02C 7/228 |

FOREIGN PATENT DOCUMENTS

| | | |
|---|---|---|
| EP | 2985422 A1 | 2/2016 |
| GB | 2531429 A | 4/2016 |

OTHER PUBLICATIONS

Extended European Search Report dated Apr. 20, 2020, received for corresponding European Application No. 19215809.5, 8 pages.

* cited by examiner

*Primary Examiner* — Michael R. Fin
(74) *Attorney, Agent, or Firm* — Kinney & Lange, P.A.

(57) ABSTRACT

Apparatus and associated methods relate to equalizing wearing of a plurality of electrical power generators of an aircraft. Such equalization is achieved by logging operating conditions of at least a powered subset of the electrical power generators and then comparing of the logged operating conditions of each of the plurality of electrical power generators. Based on the comparison of the logged operating conditions, one of the plurality of electrical power generators for use the aircraft is recommended. A signal indicative of the recommended one of the electrical power generators determined is then generated.

14 Claims, 6 Drawing Sheets

EQUALIZING WEARING OF TWO OR MORE ELECTRICAL POWER GENERATORS OF AN AIRCRAFT

BACKGROUND

Ground navigation of multi-engine aircraft is often performed using a single engine of a subset of the engines. Such use of only a fraction of the engines of the multi-engine aircraft is done for various reasons, including concerns for noise, fuel consumption, emissions, etc. Often the starboard (i.e., the right-hand side) engine can be started first as it is typically on the opposite side of the passenger gate connection (which is typically on the port side, i.e., the left-hand side). In a similar practice, shortly after landing, one of the main engines can be shut down, again, for fuel savings (and also for lower noise emissions, decreased engine wear, decreased chance of FOD damage, etc.). Such single-engine (or few-engine) taxiing to and/or from a gate leads to corresponding uneven use of the associated Integrated Drive Generators (IDGs), which are driven by the aircraft engines. This uneven use of the IDGs can lead to uneven wear, and possibly more frequent shop visits and/or unscheduled removals of the more worn-out IDG. It would be helpful to provide an intelligent way to detect, monitor, and ultimately, minimize the negative effects of uneven use of the two IDGs (on a two-engine powered aircraft). Similarly, it would be helpful to provide an intelligent way to detect, monitor, and ultimately, minimize the negative effects of uneven use of the more than two IDGs (on multi-engine powered aircraft). Similarly, it would be helpful to provide an intelligent way to detect, monitor, and ultimately, minimize the negative effects of uneven use of the more than two IDGs (per engine) on two-engine (or multiple-engine) powered aircraft

SUMMARY

Apparatus and associated methods relate to a method for equalizing wearing of a plurality of electrical power generators of an aircraft. The method includes logging operating conditions of at least a powered subset of the plurality of electrical power generators. The method includes comparing the logged operating conditions of each of the plurality of electrical power generators. The method includes recommending, based on the logged operating conditions, one of the plurality of electrical power generators for use in ground operation by the aircraft. The method also includes generating a signal indicative of the recommended one of the electrical power generators determined.

Some embodiments relate to a system for equalizing wearing of a plurality of electrical power generators of an aircraft. The system includes aircraft interface circuitry, one or more processors, and computer-readable memory. The computer-readable memory is encoded with instructions that, when executed by the one or more processors, cause the system to log operating conditions of at least a powered subset of the plurality of electrical power generators. The computer-readable memory is encoded with instructions that, when executed by the one or more processors, cause the system to compare the logged operating conditions of each of the plurality of electrical power generators. The computer-readable memory is encoded with instructions that, when executed by the one or more processors, cause the system to recommend, based on the comparison of the logged operating conditions, one of the plurality of electrical power generators for use in ground operation by the aircraft. The computer-readable memory is encoded with instructions that, when executed by the one or more processors, cause the system to generate a signal indicative of the recommended one of the IDGs determined. The computer-readable memory is also encoded with instructions that, when executed by the one or more processors, cause the system to provide, to the aircraft interface circuitry, the signal indicative of the recommended one of the IDGs determined.

DETAILED DESCRIPTION

Apparatus and associated methods relate to equalizing wearing of a plurality of Integrated Drive Generators (IDGs) driven by a corresponding plurality of engines of an aircraft. Such equalization is achieved by comparing times of operation of the plurality of IDGs and then providing a signal to a pilot of the aircraft indicating which of the IDGs has the Weight-On-Wheels (WOW) condition of the aircraft. Operating conditions of at least a powered subset of the plurality of IDGs are logged, while the weight-on-wheels condition is detected. Based on the logged operating conditions, a recommended one of the plurality of IDGs for use in ground operation by the aircraft is determined. A signal indicative of the specific one of the IDGs determined is then generated.

Figure 1:
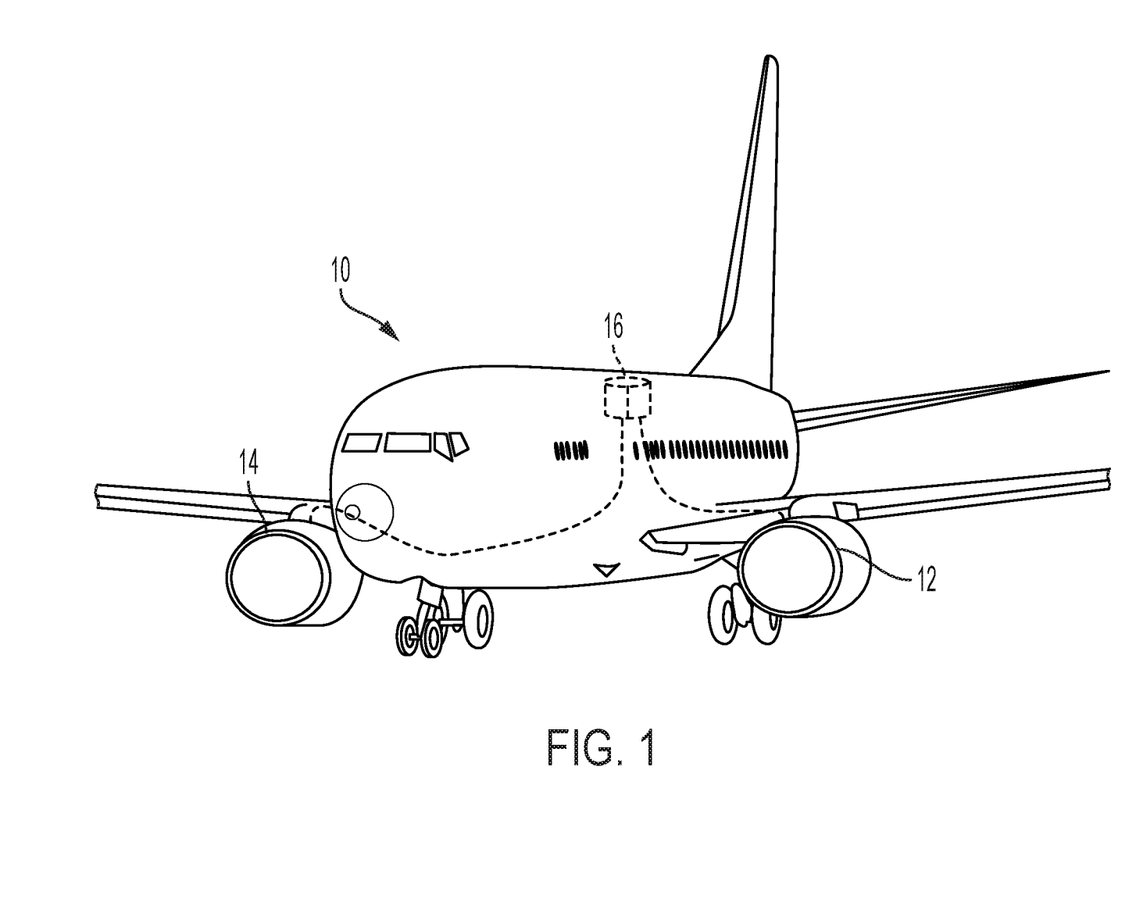
FIG. 1 is a perspective view of a taxiing aircraft equipped with an IDG equalization system.

FIG. 1 is a perspective view of a taxiing aircraft equipped with an IDG equalization system. In FIG. 1, taxiing aircraft 10 has port-side engine 12 and starboard-side engine 14. Each of engines 12 and 14 are configured to provide thrust during taxi and/or flight operations. During flight operations, both engines 12 and 14 are used, but during taxi operation the pilot can select to use one or both engines 12 and 14. Each of engines 12 and 14 drive an IDG (not depicted) so as to generate electrical power for various electrical systems of taxiing aircraft 10.

Taxiing aircraft 10 is also equipped with IDG equalization system 16 (depicted as a box), which can reside, for example, in an electronics bay of taxiing aircraft 10. IDG equalization system 16 can be configured to monitor and log one or more operating conditions of each of the IDGs of taxiing aircraft. If only one engine 12 or 14 is used during ground operations, the IDG driven by that one operating engine 12 or 14 can generate electrical power for many or all of the electrical systems of taxiing aircraft 10. Because only one engine (or a subset of engines of an aircraft equipped with more than two engines) can be used for ground operations, the IDGs driven by engines 12 and 14 can experience different amounts of operating time, provide different amounts of electrical energy to taxiing aircraft 10, and experience different demands on moving parts and fluids (e.g., oil) of the IDGs. These disparities in operating conditions can result in uneven wear and/or require more frequent maintenance of the IDGs.

IDG equalization system 16 can monitor and/or log such operating conditions of the IDGs corresponding to engines 12 and 14. IDG equalization system 16 can then use these monitored operating conditions to inform the pilot which of engines 12 or 14 can be selected for ground operation so as to equalize the available use between maintenance events of the two IDGs. IDG equalization system 16 can compare accumulated or integrated operating conditions of the IDGs corresponding to engines 12 and 14. Based on such a comparison, IDG equalization system can generate a signal indicative of the engine corresponding to the IDG that has the most remaining available use.

Figure 2A:
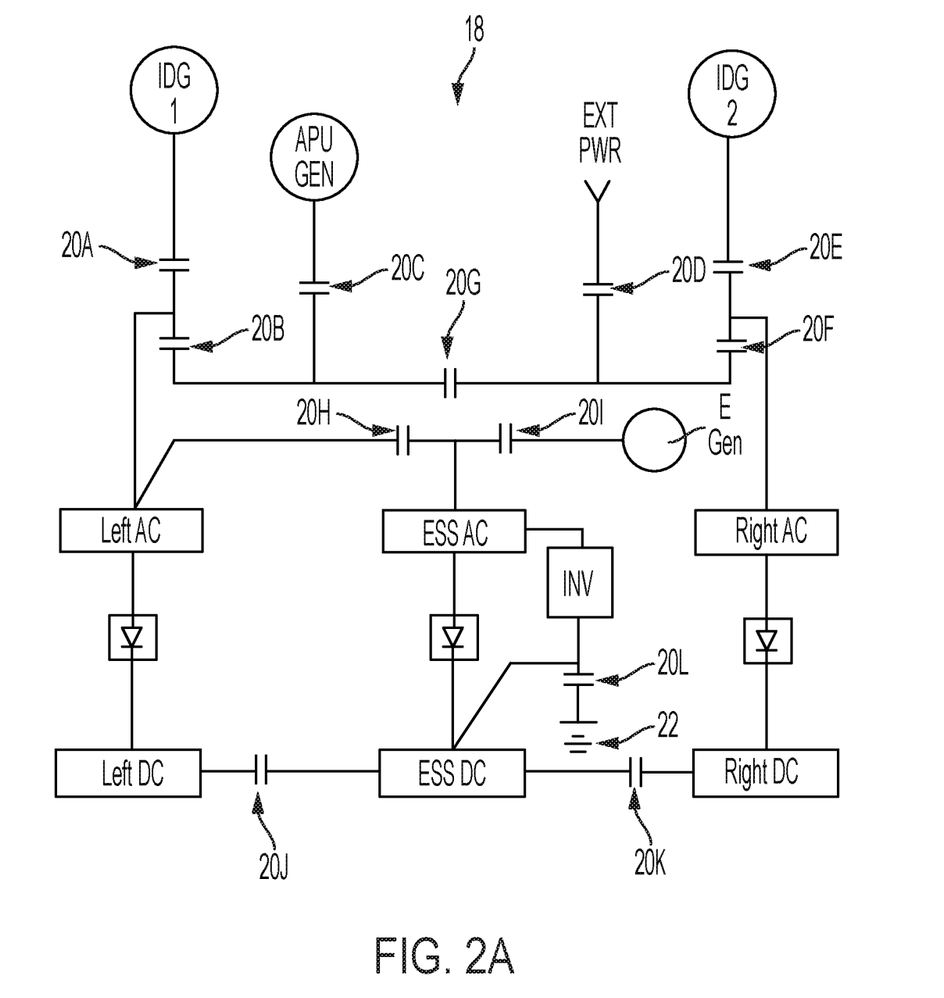
FIGS. 2A-2C are schematic views of a simplified two-channel system for electrical power generation and distribution for a two-engine aircraft.
Figure 2B:
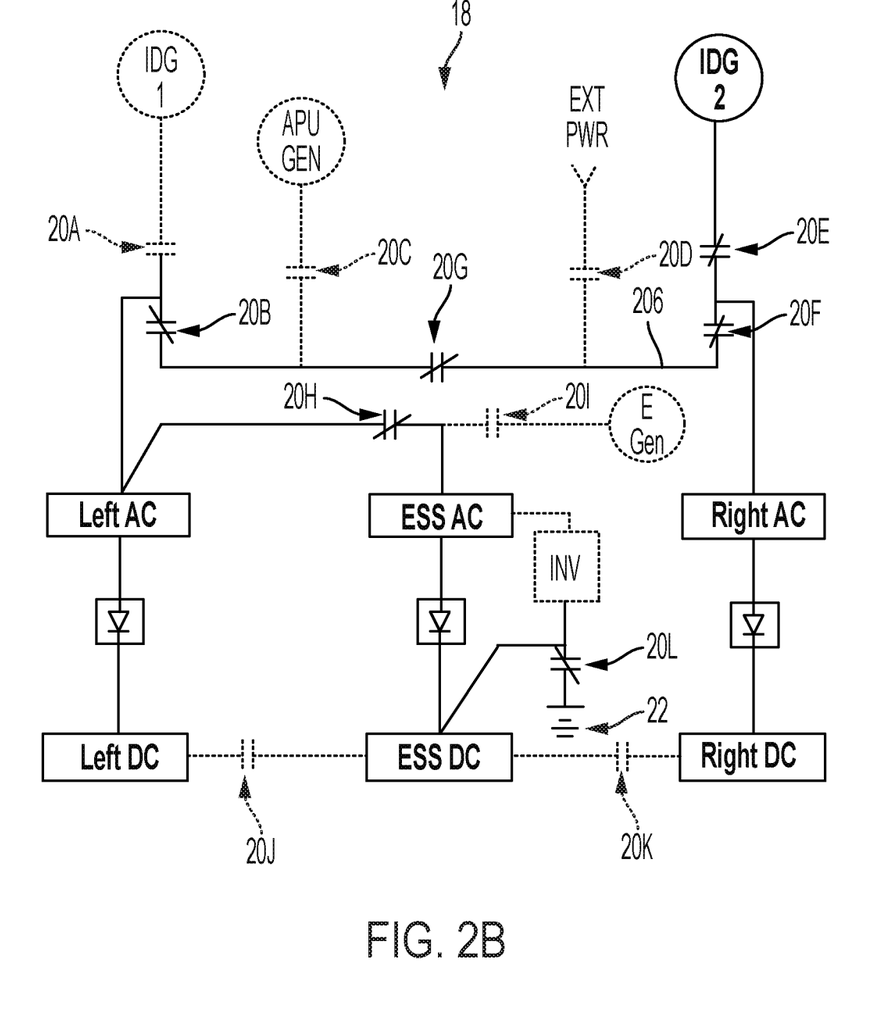
Figure 2C:
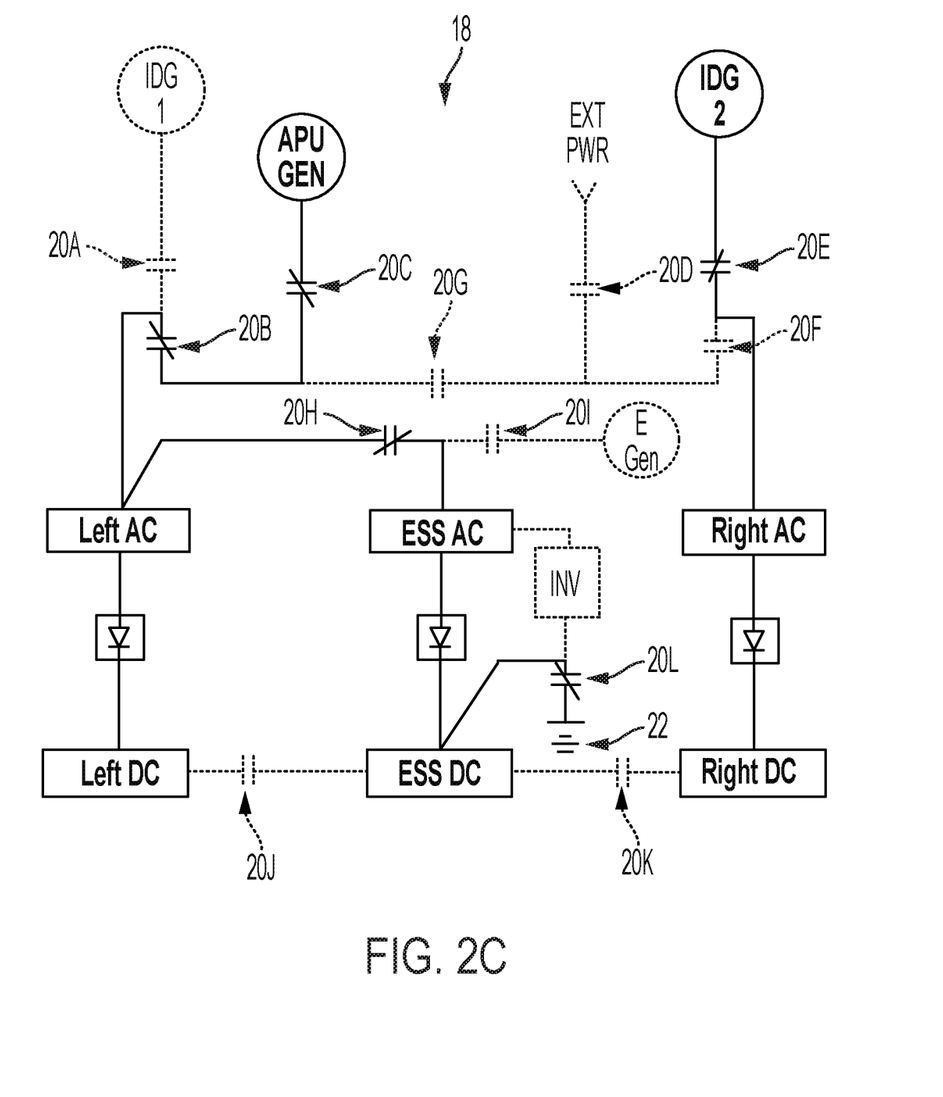

To distribute power form one or both of the IDGS driven by engines 12 and/or 14, taxiing aircraft 10 is equipped with an electrical power distribution system. FIGS. 2A-2C are schematic views of a simplified version of such an electrical distribution system for a two-engine aircraft. In FIG. 2A, electrical power distribution system 18 is equipped to receive power from IDG1, IDG2, and/or Auxiliary Power Unit generator (APU GEN), which can be made available as a backup power source to replace either or both IDG1 and IDG2. Electrical power distribution system 18 is also configured to receive power from an external power source (EXT PWR), such as a ground based power source, and from emergency generator (E GEN), which can, for example be an air driven generator. Each of IDG1 and IDG2 is driven directly by its respective engine (e.g., engine 12 or engine 14 as depicted in FIG. 1). Emergency generator E GEN can be either directly driven from a Ram Air Turbine (RAT) or from a hydraulic motor, for example. In other embodiments, other prime movers can be used in place of or in addition to one or more of those shown in FIG. 2A.

Electrical power distribution system 18 is configured so as to provide power to three Alternating Current (AC) busses: i) Left AC bus; ii) Right AC bus; and iii) Essential (ESS) AC bus. Electrical power distribution system 18 is also configured so as to provide power to three Direct Current (DC) busses. Left DC bus is generated by rectifying AC power provided by Left AC bus (e.g., via a transformer/rectifying unit). In a similar fashion, Right and ESS DC busses are generated by rectifying AC power provided by Right and ESS AC busses, respectively. Electrical power distribution system 18 also includes battery 22, which can represent a main battery, an APU battery, an ESS battery as depicted in FIG. 2A, or other aircraft battery. Battery 22 is coupled to power inverter (INV), which can convert DC power provided by battery 22 to AC power. Power inverter INV is configured so as to be capable of providing AC power to ESS bus, if other power sources are rendered inoperative or overburdened, for example.

Electrical power distribution system 18 has various switches 20A-20L (e.g., electrical contactors, switches, relays, etc.), with which to configure distribution of power to various electrical equipment of taxiing aircraft 10 (depicted in FIG. 1). Each of switches 20A-20L is configured to be switched to either an open position or a closed position, depending on which of the power sources IDG1, IDG2, APU, EXT PWR, and E GEN are providing power to taxiing aircraft 10, and depending on mode of operation (e.g., normal mode, service mode, etc.). Two different configurations of switches 20A-20L pertaining to single engine taxi operation will be described below, with reference to FIGS. 2B and 2C.

In FIG. 2B, electrical power distribution system 18 is configured for ground operation using only IDG2 generator. In FIG. 2B, switches 20B, 20E, 20F, 20G, 20H, and 20L are closed, while all other switches are opened. Such a switch configuration permits IDG2 to provide electrical power to Left AC bus, Right AC bus, and ESS AC bus.

In FIG. 2C, electrical power distribution system 18 is configured for ground operation using both IDG2 and APU generators. In FIG. 2C, switches 20B, 20C, 20E, 20H, and 20L are closed, while all other switches are opened. Such a switch configuration permits IDG2 to provide electrical power to Right AC bus, and permits APU GEN to provide electrical power to both Left AC bus and ESS AC bus.

Figure 3:
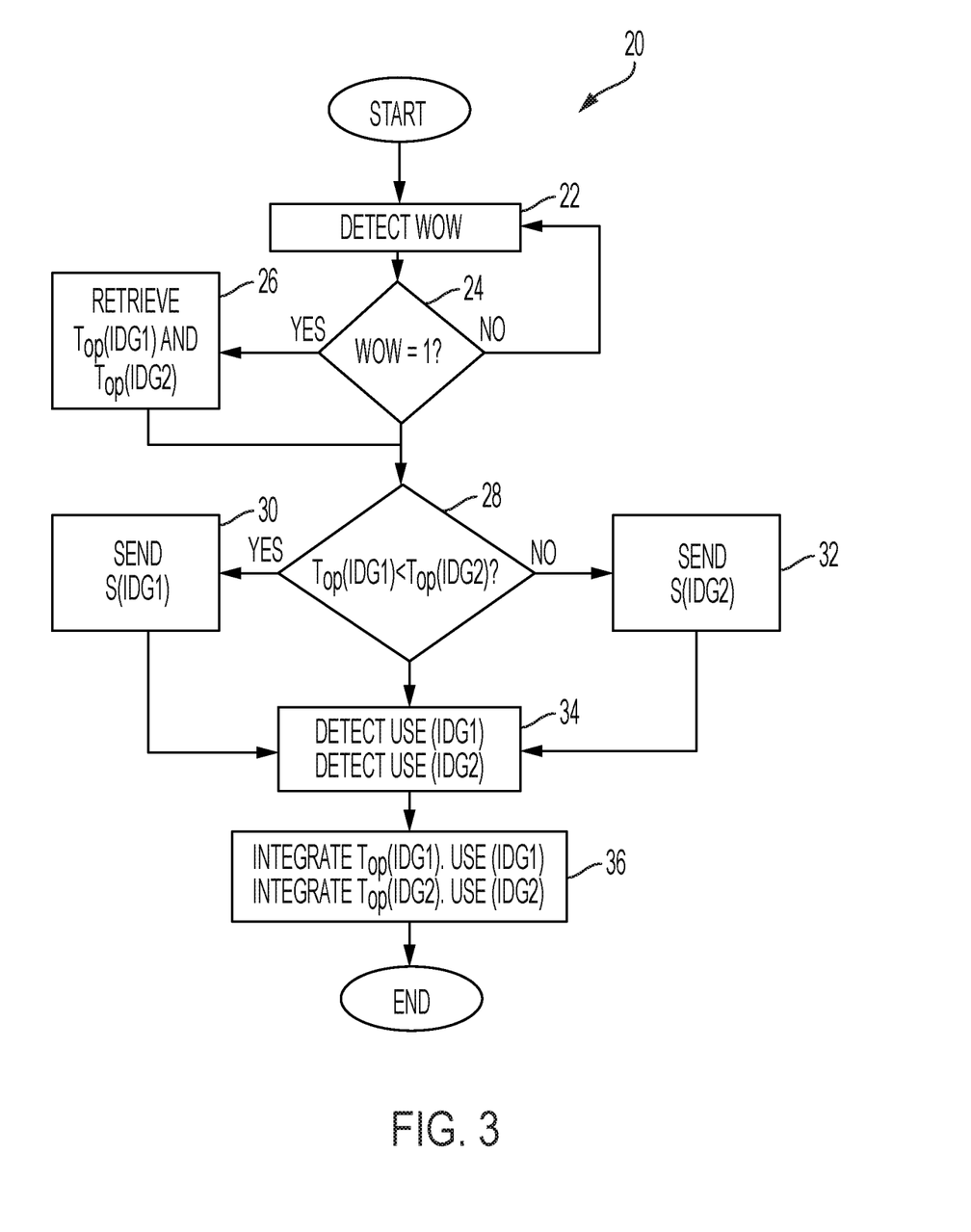
FIG. 3 is a flowchart of a method for equalizing wearing of a plurality of Integrated Drive Generators (IDGs) driven by a corresponding plurality of engines of an aircraft.

FIG. 3 is a flowchart of a method for equalizing wearing of a plurality of Integrated Drive Generators (IDGs) driven by a corresponding plurality of engines of an aircraft. In FIG. 3, method 20 begins at step 22, where a weight-on-wheels (WOW) condition of the aircraft is detected. Method 20 proceeds to step 24 where the detected WOW condition is compared with a logical true (or logic one). If, at step 24, the WOW condition is false, then method 20 returns to step 22. If, however, at step 24, the WOW condition is true, then method 20 proceeds to step 26, where integrated times of operation $T_{OP}(IDG1)$ and $T_{OP}(IDG2)$ for each of IDG1 and IDG2, respectively, are retrieved.

Then, at step 28, these times of operation are compared with one another, so as to determine which of IDG1 and IDG2 has been used less. If, at step 28, the comparison reveals that IDG1 has been used less than IDG2, then method 20 proceeds to step 30, where signal S(IDG1) is sent to the cockpit via an aircraft bus, so as to inform the pilot that IDG1 has less integrated time of operation than IDG2. If, however, at step 28, the comparison reveals that IDG1 has not been used less than IDG2, then method 20 proceeds to step 32, where signal S(IDG2) is sent to the cockpit via an aircraft bus, so as to inform the pilot that IDG1 does not have less integrated time of operation than IDG2.

Regardless of the comparison result at step 28, method 20 then proceeds to step 34, where operational use of both IDG1 and IDG2 is detected. Such detection can be indirect. For example, use of starboard-side and port-side engines can be detected. Then method 20 proceeds to step 36 where integration of times of operation $T_{OP}(IDG1)$ and $T_{OP}(IDG2)$ is performed. Such integration is weighted by the use flags detected in step 34. For example if the use flag USE(IDG1) is zero, indicative of engine 1 being turned off, then IDG1, which is driven by engine 1, is not in use. Weighting the time $T_{OP}$ by the use flag USE(IDG) then effectively accumulates no time for unused IDGs. After such integration is complete (e.g., when the plane arrives at gate or takes off again), as shown in step 36, method 20 ends.

Figure 4:
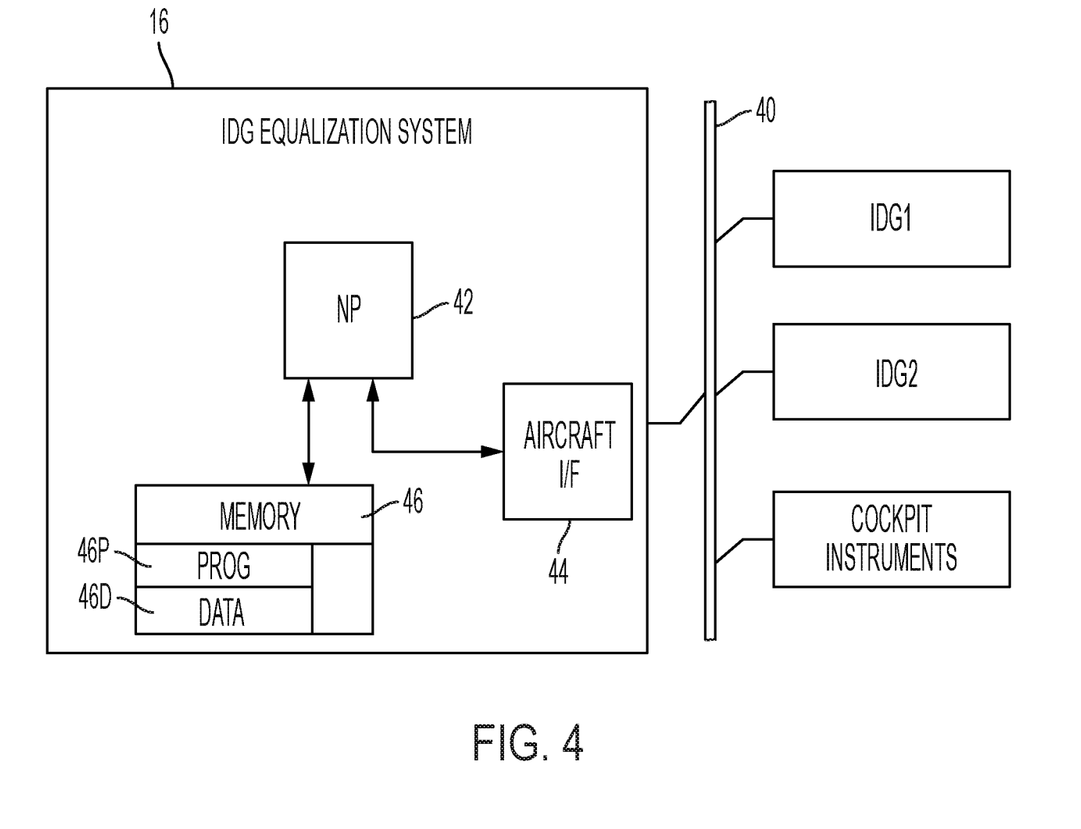
FIG. 4 is a block diagram of an embodiment of an IDG equalization system.

FIG. 4 is a block diagram of an embodiment of an IDG equalization system. In FIG. 4, IDG equalization system 16 interacts with IDG1, IDG2, and cockpit instrumentation via Aircraft bus 40. IDG equalization system 16 includes processor(s) 42, aircraft interface 44, and storage device(s) 46. Processor(s) 42 can store operating condition data in data memory 46D, for example. Processor(s) 42 can receive program instructions from program memory 46P from storage device(s) 46. Processor(s) 42 can be configured to perform IDG equalization, based on received program instructions 46P. For example processor(s) 42 can be configured to receive signals, via aircraft interface 44, indicative of engine operation. For example, each of the engines on the aircraft can send signals via a digital engine controller to the aircraft bus 40. Aircraft interface 44 can then receive such signals and provide such signals to processor(s) 42. Processor(s) 42 can also receive a signal indicative of a weight-on-wheels condition therefrom. Processor(s) 42 can then integrate a time of operation of each of the IDGs corresponding to each of the engines, based on the received signals. Processor(s) 42 can also provide, via aircraft interface 44 and aircraft bus 40, a signal indicative of which IDG has the least amount of integrated operating time to cockpit instrumentation.

As illustrated in FIG. 4, IDG equalization system 16 includes processor(s) 42, storage device(s) 46, and aircraft interface 44. However, in certain examples, IDG equalization system 16 can include more or fewer components. For instance, in some embodiments, IDG equalization system 16 can include a user interface. In some examples, such as where IDG equalization system 16 can be performed in an existing Full Authority Digital Engine Controller (FADEC) of the aircraft.

In some embodiments, an equalization system, such as IDG equalization system 16, can be used to detect, monitor, and/or minimize the negative effects of uneven use of other electrical generators besides IDGs. Such other electrical generators include: Variable Voltage-Variable Frequency (VV-VF) generators; Constant Voltage-Constant Frequency (CV-CF) generators; Variable Speed Constant Frequency (VSCF) generators; and Variable Frequency Starter/Generators (VFS/G), for example.

Processor(s) 42, in one example, is configured to implement functionality and/or process instructions for execution within IDG equalization system 16. For instance, processor(s) 42 can be capable of processing instructions stored in storage device(s) 46. Examples of processor(s) 42 can include any one or more of a microprocessor, a controller, a digital signal processor(s) (DSP), an application specific integrated circuit (ASIC), a field-programmable gate array (FPGA), or other equivalent discrete or integrated logic circuitry. Processor(s) 42 can be configured to perform IDG equalization.

Storage device(s) 46 can be configured to store information within IDG equalization system 16 during operation. Storage device(s) 46, in some examples, is described as computer-readable storage media. In some examples, a computer-readable storage medium can include a non-transitory medium. The term "non-transitory" can indicate that the storage medium is not embodied in a carrier wave or a propagated signal. In certain examples, a non-transitory storage medium can store data that can, over time, change (e.g., in RAM or cache). In some examples, storage device(s) 46 is a temporary memory, meaning that a primary purpose of storage device(s) 46 is not long-term storage. Storage device(s) 46, in some examples, is described as volatile memory, meaning that storage device(s) 46 do not maintain stored contents when power to IDG equalization system 16 is turned off. Examples of volatile memories can include random access memories (RAM), dynamic random access memories (DRAM), static random access memories (SRAM), and other forms of volatile memories. In some examples, storage device(s) 46 is used to store program instructions for execution by processor(s) 42. Storage device(s) 46, in one example, is used by software or applications running on IDG equalization system 16 (e.g., a software program implementing equalization of multiple IDGs).

Storage device(s) 46, in some examples, can also include one or more computer-readable storage media. Storage device(s) 46 can be configured to store larger amounts of information than volatile memory. Storage device(s) 46 can further be configured for long-term storage of information. In some examples, storage device(s) 46 include non-volatile storage elements. Examples of such non-volatile storage elements can include magnetic hard discs, optical discs, flash memories, or forms of electrically programmable memories (EPROM) or electrically erasable and programmable (EEPROM) memories.

Aircraft interface 44 can be used to communicate information between IDG equalization system 16 and an aircraft. In some embodiments, such information can include aircraft conditions, flying conditions, and/or atmospheric conditions. In some embodiments, such information can include data processed by IDG equalization system 16, such as, for example, alert signals. Aircraft interface 44 can also include a communications module. Aircraft interface 44, in one example, utilizes the communications module to communicate with external devices via one or more networks, such as one or more wireless or wired networks or both. The communications module can be a network interface card, such as an Ethernet card, an optical transceiver, a radio frequency transceiver, or any other type of device that can send and receive information. Other examples of such network interfaces can include Bluetooth, 3G, 4G, and Wi-Fi 33 radio computing devices as well as Universal Serial Bus (USB). In some embodiments, communication with the aircraft can be performed via a communications bus, such as, for example, an Aeronautical Radio, Incorporated (ARINC) standard communications protocol. In an exemplary embodiment, aircraft communication with the aircraft can be performed via a communications bus, such as, for example, a Controller Area Network (CAN) bus.

Discussion of Possible Embodiments

The following are non-exclusive descriptions of possible embodiments of the present invention.

Apparatus and associated methods relate to a method for equalizing wearing of a plurality of electrical power generators of an aircraft. The method includes logging operating conditions of at least a powered subset of the plurality of electrical power generators. The method includes performing a comparison of the logged operating conditions of each of the plurality of electrical power generators. The method includes determining, based on the logged operating conditions, a recommended one of the plurality of electrical power generators for use in ground operation by the aircraft. The method also includes generating a signal indicative of the recommended one of the electrical power generators determined.

The method of the preceding paragraph can optionally include, additionally and/or alternatively, any one or more of the following features, configurations and/or additional components:

A further embodiment of the foregoing method, wherein the electrical power generators can include a plurality of Integrated Drive Generators (IDGs).

A further embodiment of any of the foregoing methods can further include detecting a weight-on-wheels (WOW) condition of the aircraft.

A further embodiment of any of the foregoing methods, wherein the operating conditions of the plurality of IDGs can be logged only while weight on wheels condition is detected.

A further embodiment of any of the foregoing methods, wherein the powered subset of the plurality of IDGs can include IDGs corresponding to an operating subset of the plurality of engines in operation while the weight-on-wheels condition is detected.

A further embodiment of any of the foregoing methods, wherein logging operating conditions of at least the powered subset of the plurality of IDGs can include logging operating conditions of each of the plurality of IDGs.

A further embodiment of any of the foregoing methods, wherein the operating conditions of at least the powered subset of the plurality of IDGs logged can include at least one of operating time(s) of, electrical energy level(s) provided by, and oil temperature(s) of at least the powered subset of the plurality of IDGs.

A further embodiment of any of the foregoing methods can further include comparing the logged operating times of each of the plurality of IDGS. The recommend one of the plurality of IDGs for use in ground operation is determined based, at least in part, on the comparison of the logged operating times of the IDGs.

A further embodiment of any of the foregoing methods, wherein the recommend one of the plurality of IDGs for use in ground operation can correspond to a smallest operating time logged.

A further embodiment of any of the foregoing methods can further include comparing the logged electrical energy level(s) provided by each of the plurality of IDGS. The recommend one of the plurality of IDGs for use in ground operation can be determined based, at least in part, on the comparison of the logged operating times of the IDGs.

A further embodiment of any of the foregoing methods, wherein the recommend one of the plurality of IDGs for use in ground operation can correspond to a lowest electrical energy level provided.

A further embodiment of any of the foregoing methods can further include comparing the logged oil temperature(s) of the IDGS. The recommend one of the IDGs for use in ground operation can be determined based on the comparison of the logged oil temperature(s) of the IDGs.

Some embodiments relate to a system for equalizing wearing of a plurality of electrical power generators of an aircraft. The system includes aircraft interface circuitry, one or more processors, and computer-readable memory. The computer-readable memory is encoded with instructions that, when executed by the one or more processors, cause the system to log operating conditions of at least a powered subset of the plurality of electrical power generators. The computer-readable memory is encoded with instructions that, when executed by the one or more processors, cause the system to perform a comparison the logged operating conditions of each of the plurality of electrical power generators. The computer-readable memory is encoded with instructions that, when executed by the one or more processors, cause the system to determine, based on the comparison of the logged operating conditions, a recommended one of the plurality of electrical power generators for use in ground operation by the aircraft. The computer-readable memory is encoded with instructions that, when executed by the one or more processors, cause the system to generate a signal indicative of the recommended one of the IDGs determined. The computer-readable memory is also encoded with instructions that, when executed by the one or more processors, cause the system to provide, to the aircraft interface circuitry, the signal indicative of the recommended one of the IDGs determined.

The system of the preceding paragraph can optionally include, additionally and/or alternatively, any one or more of the following features, configurations and/or additional components:

A further embodiment of the foregoing system, wherein the electrical power generators can include a plurality of Integrated Drive Generators (IDGs)

A further embodiment of any of the foregoing systems, wherein the computer-readable memory can be further encoded with instructions that, when executed by the one or more processors, cause the system to detect a weight-on-wheels (WOW) condition of the aircraft.

A further embodiment of any of the foregoing systems, wherein the operating conditions of the plurality of IDGs can be logged only while weight on wheels condition is detected.

A further embodiment of any of the foregoing systems, wherein the powered subset of the plurality of IDGs can include IDGs corresponding to an operating subset of the plurality of engines in operation while the weight-on-wheels condition is detected.

A further embodiment of any of the foregoing systems, wherein logging operating conditions of at least the powered subset of the plurality of IDGs can include logging operating conditions of each of the plurality of IDGs.

A further embodiment of any of the foregoing systems, wherein the operating conditions of at least a powered subset of the plurality of IDGs logged can include at least one of operating time(s) of, electrical energy level(s) provided by, and oil temperature(s) of at least the powered subset of the plurality of IDGs.

A further embodiment of any of the foregoing systems, wherein the computer-readable memory can be further encoded with instructions that, when executed by the one or more processors, cause the system to compare the logged operating times of each of the plurality of IDGS. The recommend one of the plurality of IDGs for use in ground operation can be determined based, at least in part, on the comparison of the logged operating times of the IDGs.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A method for equalizing wearing of a plurality of Integrated Drive Generators (IDGs), each driven by a corresponding one of a plurality of engines of an aircraft, the method comprising:
   detecting a weight-on-wheels (WOW) condition of the aircraft;
   logging operating conditions of at least a powered subset of the plurality of IDGs only while the weight on wheels condition is detected;
   comparing the logged operating conditions of each of the plurality of IDGs;
   recommending, based on the logged operating conditions of the plurality of IDGs, one of the plurality of engines for use in ground operation by the aircraft; and
   generating a signal indicative of the recommended one of the plurality of engines.

2. The method of claim 1, wherein the powered subset of the plurality of IDGs includes IDGs corresponding to an operating subset of the plurality of engines in operation while the weight-on-wheels condition is detected.

3. The method of claim 1, wherein logging operating conditions of at least the powered subset of the plurality of IDGs includes logging operating conditions of each of the plurality of IDGs.

4. The method of claim 1, wherein the operating conditions of at least the powered subset of the plurality of IDGs logged include at least one of operating time(s) of, electrical energy level(s) provided by, and oil temperature(s) of at least the powered subset of the plurality of IDGs.

5. The method of claim 4, further comprising:
comparing the logged operating times of each of the plurality of IDGS,
wherein the recommended one of the plurality of engines for use in ground operation is determined based, at least in part, on the comparison of the logged operating times of the IDGs.

6. The method of claim 5, wherein the recommended one of the plurality of engines for use in ground operation corresponds to a smallest operating time logged of the corresponding one of the plurality of IDGs.

7. The method of claim 4, further comprising:
comparing the logged electrical energy level(s) provided by each of the plurality of IDGS,
wherein the recommended one of the plurality of engines for use in ground operation is determined based, at least in part, on the comparison of the logged electrical energy level(s) provided by each of the plurality of IDGs.

8. The method of claim 7, wherein the recommended one of the plurality of engines for use in ground operation corresponds to a lowest electrical energy level logged of the plurality of IDGs.

9. The method of claim 4, further comprising:
comparing the logged oil temperature(s) of the IDGS,
wherein the recommended one of the engines for use in ground operation is determined based on the comparison of the logged oil temperature(s) of the IDGs.

10. A system for equalizing wearing of a plurality of Integrated Drive Generators (IDGs), each driven by a corresponding one of a plurality of engines of an aircraft, the system comprising:
aircraft interface circuitry;
one or more processors; and
computer-readable memory encoded with instructions that, when executed by the one or more processors, cause the system to:
detect a weight-on-wheels (WOW) condition of the aircraft;
log operating conditions of at least a powered subset of the plurality of IDGs only while the weight on wheels condition is detected;
compare the logged operating conditions of each of the plurality of IDGs;
recommend, based on the comparison of the logged operating conditions of the plurality of IDGs, one of the plurality of engines for use in ground operation by the aircraft; and
generate a signal indicative of the recommended one of the plurality of engines determined,
provide, to the aircraft interface circuitry, the signal indicative of the recommended one of the plurality of engines.

11. The system of claim 10, wherein the powered subset of the plurality of IDGs includes IDGs corresponding to an operating subset of the plurality of engines in operation while the weight-on-wheels condition is detected.

12. The system of claim 10, wherein logging operating conditions of at least the powered subset of the plurality of IDGs includes logging operating conditions of each of the plurality of IDGs.

13. The system of claim 10, wherein the operating conditions of at least a powered subset of the plurality of IDGs logged include at least one of operating time(s) of, electrical energy level(s) provided by, and oil temperature(s) of at least the powered subset of the plurality of IDGs.

14. The system of claim 13, wherein the computer-readable memory is further encoded with instructions that, when executed by the one or more processors, cause the system to:
compare the logged operating times of each of the plurality of IDGS,
wherein the recommended one of the plurality of engines for use in ground operation is determined based, at least in part, on the comparison of the logged operating times of the IDGs.

* * * * *